US011925932B2

(12) United States Patent
Choy

(10) Patent No.: US 11,925,932 B2
(45) Date of Patent: Mar. 12, 2024

(54) MICROFLUIDIC DEVICES

(71) Applicant: HEWLETT-PACKARD DEVELOPMENT COMPANY, L.P., Spring, TX (US)

(72) Inventor: Si-lam Choy, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 550 days.

(21) Appl. No.: 17/045,247

(22) PCT Filed: Apr. 24, 2018

(86) PCT No.: PCT/US2018/029169
§ 371 (c)(1),
(2) Date: Oct. 5, 2020

(87) PCT Pub. No.: WO2019/209273
PCT Pub. Date: Oct. 31, 2019

(65) Prior Publication Data
US 2021/0170397 A1 Jun. 10, 2021

(51) Int. Cl.
*B01L 3/00* (2006.01)

(52) U.S. Cl.
CPC ..... *B01L 3/50273* (2013.01); *B01L 3/502715* (2013.01); *B01L 2200/0684* (2013.01); *B01L 2300/0883* (2013.01); *B01L 2400/0406* (2013.01); *B01L 2400/0442* (2013.01)

(58) Field of Classification Search
CPC ........... B01L 3/50273; B01L 3/502715; B01L 2200/0684; B01L 2300/0883; B01L 2400/0406; B01L 2400/0442; B01L 2400/041
See application file for complete search history.

(56) References Cited

U.S. PATENT DOCUMENTS

| | | | |
|---|---|---|---|
| 4,329,698 | A | 5/1982 | Smith |
| 4,614,953 | A | 9/1986 | Lapeyre |
| 4,877,745 | A | 10/1989 | Hayes et al. |
| 5,032,850 | A | 7/1991 | Andeen et al. |
| 5,587,128 | A | 12/1996 | Wilding et al. |

(Continued)

FOREIGN PATENT DOCUMENTS

| | | |
|---|---|---|
| CA | 2970491 A1 | 6/2016 |
| EP | 0470202 B1 | 6/1994 |

(Continued)

OTHER PUBLICATIONS

D. Wallace et al. "Ink-Jet as a MEMS Manufacturing Tool"; Micro Fab Technologies.

(Continued)

*Primary Examiner* — Benjamin R Whatley
*Assistant Examiner* — Peter Valentin Diaz
(74) *Attorney, Agent, or Firm* — Foley & Lardner LLP

(57) ABSTRACT

An example microfluidic device includes a microfluidic network through which operational fluid is to flow and a droplet ejector. The microfluidic device includes a drive fluid storage volume to contain drive fluid, the drive fluid storage volume connected in series between the microfluidic network and the droplet ejector. When the drive fluid is ejected from the droplet ejector, the operational fluid is drawn through the microfluidic network.

18 Claims, 6 Drawing Sheets

(56) References Cited

U.S. PATENT DOCUMENTS

| | | | |
|---|---|---|---|
| 5,892,524 A | 4/1999 | Silverbrook | |
| 6,432,694 B1 | 8/2002 | Malmqvist | |
| 6,450,775 B1 | 9/2002 | Hutchinson et al. | |
| 6,464,336 B1 | 10/2002 | Sharma | |
| 6,550,892 B1 | 4/2003 | Sharma | |
| 7,125,447 B2 | 10/2006 | Sugita et al. | |
| 7,179,423 B2 | 2/2007 | Böhm et al. | |
| 7,456,012 B2 | 11/2008 | Ryttsén et al. | |
| 7,763,453 B2 | 7/2010 | Clemmens et al. | |
| 8,158,083 B2 | 4/2012 | Krug et al. | |
| 8,287,112 B2 | 10/2012 | Van Thillo et al. | |
| 8,308,339 B2 | 11/2012 | Karpetsky et al. | |
| 8,426,209 B2 | 4/2013 | Butler et al. | |
| 8,697,009 B2 | 4/2014 | Saltsman et al. | |
| 8,746,285 B2 | 6/2014 | Hong et al. | |
| 8,894,761 B2 | 11/2014 | Birecki et al. | |
| 9,138,714 B2 | 9/2015 | Samper et al. | |
| 9,410,977 B2 | 8/2016 | Stone et al. | |
| 9,523,013 B2 | 12/2016 | Reboa, Jr. | |
| 9,663,819 B2 | 5/2017 | Jovanovich et al. | |
| 2001/0016322 A1 | 8/2001 | Caren et al. | |
| 2002/0092767 A1 | 7/2002 | Bjornson et al. | |
| 2002/0127736 A1 | 9/2002 | Chou et al. | |
| 2002/0153251 A1 | 10/2002 | Sassi et al. | |
| 2003/0180449 A1 | 9/2003 | Wiktorowicz et al. | |
| 2005/0106066 A1 | 5/2005 | Saltsman et al. | |
| 2006/0244799 A1 | 11/2006 | Sasa et al. | |
| 2007/0035579 A1 | 2/2007 | Bibl et al. | |
| 2007/0052759 A1 | 3/2007 | Park et al. | |
| 2007/0095393 A1* | 5/2007 | Zucchelli | F16K 99/0001 137/68.11 |
| 2007/0111303 A1 | 5/2007 | Inoue et al. | |
| 2008/0114225 A1 | 5/2008 | Rabinovitz | |
| 2008/0136862 A1 | 6/2008 | Kawabe et al. | |
| 2008/0252679 A1 | 10/2008 | Pierik et al. | |
| 2009/0075390 A1* | 3/2009 | Linder | A61L 2/0082 422/69 |
| 2009/0130745 A1 | 5/2009 | Williams et al. | |
| 2009/0148933 A1 | 6/2009 | Battrell et al. | |
| 2009/0278895 A1 | 11/2009 | Kamito | |
| 2010/0143905 A1 | 6/2010 | Lane et al. | |
| 2010/0214383 A1 | 8/2010 | Silverbrook et al. | |
| 2011/0064613 A1 | 3/2011 | Chen | |
| 2011/0143968 A1 | 6/2011 | Chen et al. | |
| 2012/0113197 A1 | 5/2012 | Kashu et al. | |
| 2012/0115738 A1 | 5/2012 | Zhou et al. | |
| 2014/0051604 A1 | 2/2014 | Davies et al. | |
| 2014/0221239 A1* | 8/2014 | Carman | B01L 3/502784 435/6.12 |
| 2015/0273470 A1 | 10/2015 | Hoffmann | |
| 2015/0292988 A1 | 10/2015 | Bharadwaj et al. | |
| 2015/0298119 A1 | 10/2015 | Williams et al. | |
| 2016/0045914 A1 | 2/2016 | Abate et al. | |
| 2016/0175864 A1 | 6/2016 | Bloc | |
| 2016/0195524 A1 | 7/2016 | Cowan et al. | |
| 2016/0341337 A1 | 11/2016 | Govyadinov et al. | |
| 2017/0021620 A1 | 1/2017 | Oikawa et al. | |
| 2017/0165972 A1 | 6/2017 | Lee | |
| 2017/0205438 A1 | 7/2017 | Peters | |
| 2017/0246867 A1 | 8/2017 | Govyadinov et al. | |
| 2018/0015473 A1 | 1/2018 | Bharadwaj et al. | |
| 2018/0017175 A1 | 1/2018 | Liang et al. | |
| 2018/0030515 A1 | 2/2018 | Regev et al. | |
| 2018/0052082 A1 | 2/2018 | Groll et al. | |
| 2020/0207112 A1 | 7/2020 | Yamanaka et al. | |
| 2020/0216840 A1 | 7/2020 | Tanno et al. | |
| 2021/0008890 A1 | 1/2021 | Bhatt et al. | |
| 2021/0046754 A1 | 2/2021 | Ungerer et al. | |
| 2021/0331482 A1 | 10/2021 | Govyadinov et al. | |

FOREIGN PATENT DOCUMENTS

| | | | |
|---|---|---|---|
| EP | 0990525 B1 | 8/2006 | |
| JP | 5007016 B2 | 8/2012 | |
| KR | 20110035113 A | 4/2011 | |
| WO | WO-1997011133 A1 | 3/1997 | |
| WO | WO-2008024319 A2 | 2/2008 | |
| WO | WO-2011094577 A2 | 8/2011 | |
| WO | WO-2013135878 A1 | 9/2013 | |
| WO | WO-2013176767 A1 | 11/2013 | |
| WO | WO-2016175864 A1 * | 11/2016 | B01L 3/502753 |
| WO | WO-2017091213 A1 | 6/2017 | |
| WO | WO-2017180660 A1 | 10/2017 | |

OTHER PUBLICATIONS

Li Baoqing et al., "Piezoelectric-driven droplet impact printing with an interchangeable microfluidic cartridge", Sep. 1, 2015, Biomicrofluidics 9, 054101.

Liu Robin et al., Self-contained, fully integrated biochip for sample preparation, Polymerase Chain Reaction Amplification, and DNA Microarray Detection, Feb. 25, 2004, Analitical Chemistry.

Ly et al. Automated Reagent-Dispensing System for Microfluidic Cell Biology Assays; Department of Bioengineering, Samueli School of Engineering and Applied Sciences, University of California Los Angeles, CA, USA, Crump Institute for Molecular Imaging, University of California Los Angeles, CA, USA,Department of Moleculor and Medical Pharmacology, et al.

Perch-Nielsen R. Ivan et al., A total integrated biochip system for detection of SNP in Cancer, Jan. 11-14, 2010, Proceedings of the 3rd International Conference on the development of BME.

Rocker Scientific Co. Ltd.; Rocker products; Filtration apparatus/ VF11 product sheet.

Tian Qingchang et al., An integrated temporary negative pressure assisted microfluidic chip for DNA isolation and digital POR detection, Sep. 14, 2015, RSC Advances.

Welch David et al., Real-time feedback control of pH within microfluidics using integrated sensing and actuation, Jan. 23, 2014, Lab on Chip.

Xu et al. A self-contained polymeric cartridge for automated biological sample preparation; Institute of Bioengineering and Nanotechnology, 31 Biopolis Way, The Nanos, Singapore 138669.

Zheng et al. Micro-reagent Dispensing Method Based on Pulse Driving & Controlling of Micro-fluids Technology and Application Research; School of Mechanical Engineering, Nanjing 210094, China.

Zhou Hongbo et al., "A facile on-demand droplet microfluidic system for lab-on-a-chip applications", Microfluid Nanofluid 2014 16:667-675.

* cited by examiner

MICROFLUIDIC DEVICES

BACKGROUND

Microfluidics involves the manipulation of fluids constrained within small volumes. Operational fluid may be moved through small chambers, channels, or other small components for carrying out various operations.

Applications of microfluidics include biological and chemical testing, such as nucleic acid testing, biochemical assays, and biological cell manipulation. Microfluidic operations may take place on a lab-on-a-chip device. The flow of operational fluid in such applications may be driven by micropumps or other active components.

DETAILED DESCRIPTION

The flow of operational fluid for microfluidic applications may be controlled by micropumps, microvalves, and other active components. A drop ejector, such as a thermal inkjet drop ejector or piezoelectric drop ejector, may also provide fluid flow in some applications. For example, a thermal inkjet (TIM drop ejector, which may be termed a thermal drop ejector, locally heats a fluid to generate a rapidly expanding bubble that ejects a drop, or droplet, of the fluid out of an orifice, Ejection of the drop draws additional upstream fluid toward the drop ejector. A thermal drop ejector allows active control and modulation of flow of fluids without the need of moving mechanisms such as active valves.

A drop ejector may only be compatible with fluids which conform to certain fluid properties. In the example of thermal inkjet drop ejectors, non-aqueous fluids, high-viscosity liquids, non-Newtonian liquids, or fluids which include suspended solids may not be compatible with bubble formation and refill of a drop ejection chamber. These types of fluids may only be jetted inefficiently, or not at all. It may nevertheless be desirable to use a drop ejector to drive fluid movement in a microfluidic network containing such fluids.

A microfluidic device may provide flow of operational fluid by drop ejection of drive fluid through a drop ejector.

The microfluidic device may include a microfluidic network through which operational fluid is to flow, a drop ejector, and a drive fluid volume to contain drive fluid located between the microfluidic network and the drop ejector. The operational fluid may be optimized for an operation in the microfluidic network, while the drive fluid may be optimized for drop ejection. Ejection of the drive fluid through the drop ejector may induce a pressure drop that draws operational fluid, which may be incompatible with ejection from a drop ejector, through the microfluidic network.

Figure 1:
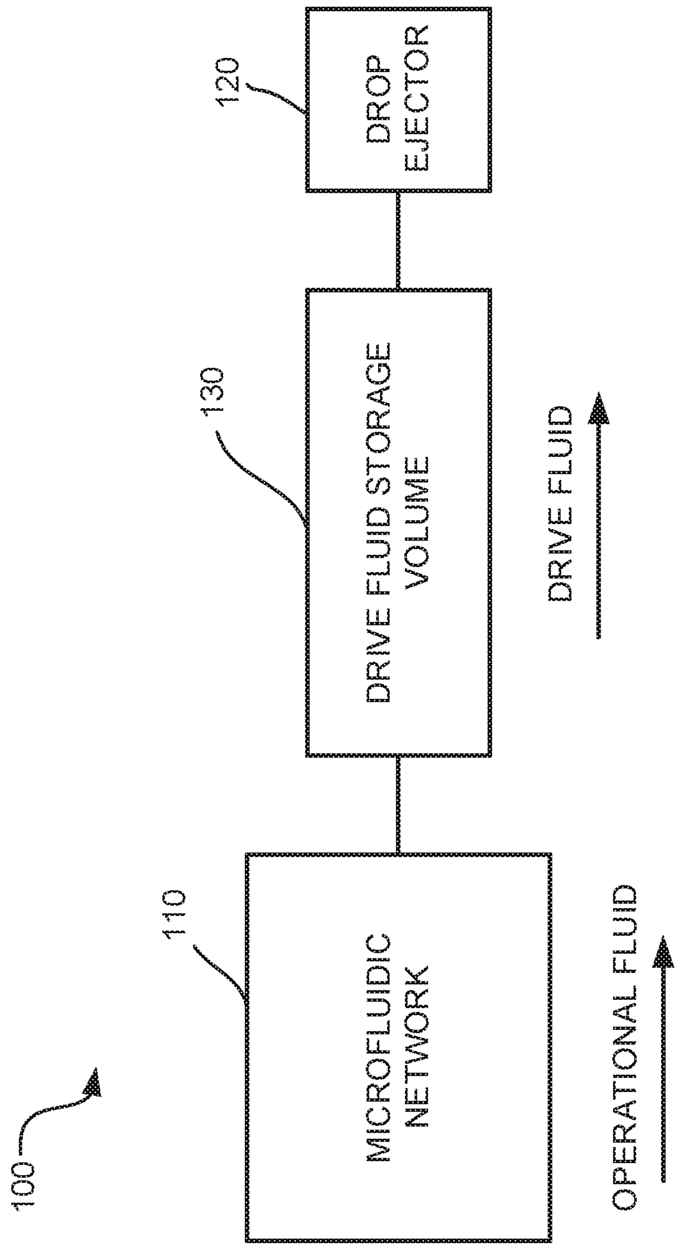
FIG. 1 is a schematic diagram of an example microfluidic device that uses drop ejection of drive fluid to induce flow of operational fluid.

FIG. 1 is a schematic diagram of an example microfluidic device 100. The microfluidic device 100 includes a microfluidic network 110, a drop ejector 120, which may also be termed a droplet ejector, and a drive fluid storage volume 130 connected in series between the microfluidic network 110 and the drop ejector 120. The drive fluid storage volume 130 is upstream of the drop ejector 120, and the microfluidic network 110 is upstream of the drive fluid storage volume 130. It is to be understood that the drop ejector 120 may represent one or a plurality of drop ejectors. For example, a bank or array of drop ejectors 120 may be provided to eject droplets of drive fluid in parallel.

The microfluidic network 110 may include an inlet, outlet, chamber, reservoir, passage, conduit, volume, or network thereof through which operational fluid is to flow. The operational fluid may include one or more fluids selected to perform an operation in the microfluidic network 110. The microfluidic network 110 may include an air vent or other pressure regulating element to equalize pressure in the microfluidic network 110.

The drive fluid storage volume 130 is to contain drive fluid. The drive fluid storage volume 130 may include a chamber, passage, conduit, volume, or network thereof from which the drive fluid is to flow into the drop ejector 120 for ejection from the drop ejector 120. The drive fluid may include one or more fluids optimized for, or at least compatible with, ejection from drop ejector 120. The drive fluid may be optimized by tuning properties such as viscosity, surface tension, density, boiling point, and other properties for compatibility with the drop ejector 120.

When the drop ejector 120 ejects drive fluid, pressure in the microfluidic device 100 is reduced, causing operational fluid to be drawn through the microfluidic network 110 toward the drive fluid storage volume 130.

The drop ejector 120 may include a thermal drop ejector which generates a bubble to eject a drop of fluid out a nozzle of the drop ejector 120. In other examples, the drop ejector 120 may include an inertial pump, a piezoelectric drop ejector, an electro-osmosis pump, or another flow device that operates on a fluid that conforms to certain characteristics, which may not be compatible with an operational fluid. For example, a thermal drop ejector may operate efficiently with fluids having low viscosity and low boiling point, but an operational fluid may have high viscosity and high boiling point.

The operational fluid may be optimized for biological or chemical testing, or another microfluidic operation that uses an operational fluid with certain characteristics which may not be optimized for drop ejection. For example, the operational fluid may include a biological fluid such as blood.

The operational fluid may be of high viscosity or have non-Newtonian properties. The operational fluid may include a non-aqueous fluid, such as gas or oil. The operational fluid may include suspended solids. The operational fluid may have a high boiling point. Such properties may be incompatible with drop ejection, and may interfere with bubble formation or refill of the drop ejection chamber.

The operational fluid may include gels or fluids with contact angles greater than 90 degrees on the materials used in the drop ejector, and may not be able to wick into channels to wet the drop ejection chamber through capillary action alone.

Such properties may be incompatible with drop ejection, but may nevertheless be desirable in some operational fluids for microfluidic applications.

By using operational fluid optimized for microfluidic processes in the microfluidic network 110 and using drive fluid optimized for drop ejection in a drive fluid storage volume 130 between the microfluidic network 110 and drop ejector 120, a drop ejector 120 may be used to induce flow in the operational fluid through the microfluidic network 110, without compromising fluid characteristics of either the operational fluid or the drive fluid.

The microfluidic device 100 may be provided with one or both of the drive fluid storage volume 130 preloaded with drive fluid and the microfluidic network 110 preloaded with operational fluid. The drive fluid may be compatible with wetting the drop ejector by passive capillary action, and the microfluidic device may be provided with the drop ejector 120 pre-wetted with the drive fluid. The operational fluid may be incompatible with wetting the drop ejector 120 by passive capillary action alone, but may be compatible with being drawn through the chambers, conduits, volumes, and other structures and components of the microfluidic network 110 by the negative pressure applied by ejection of the drive fluid from drop ejector 120.

In some examples, the operational fluid and the drive fluid may be liquids in fluid contact. Further, in some examples, the operational fluid may be pulled into the drive fluid storage volume 130 by drop ejection of the drive fluid. In some examples, the operational fluid may mix with the drive fluid to some tolerable degree without interfering with the ejection of the drive fluid from the drop ejector 120.

In some examples, to compensate for incompatible fluid flow properties in the operational fluid, the stored volume of drive fluid may be greater than the transported volume of the operational fluid drawn through the microfluidic network 110. Excess drive fluid may help ensure that the process performed by the operational fluid is completed.

Even in applications where the operational fluid may be compatible with drop ejection, the drive fluid may act as a barrier between the operational fluid and the outside environment to preserve properties of the operational fluid. For example, water or solvent loss from the operational fluid may be reduced by a drive fluid that acts as a barrier.

Figure 2:
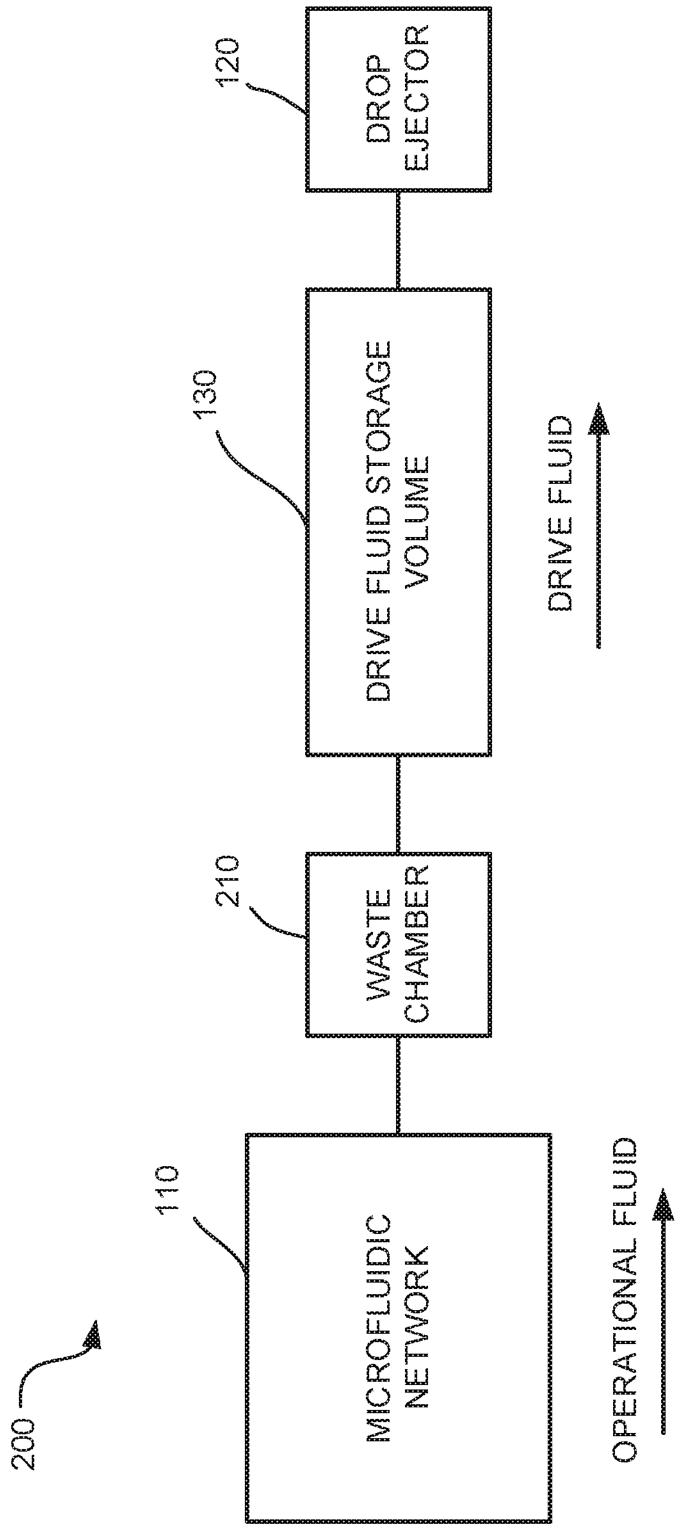
FIG. 2 is a schematic diagram of another example microfluidic device that uses drop ejection of drive fluid to induce flow of operational fluid, the microfluidic device including a waste chamber for operational fluid.

FIG. 2 is a schematic diagram of another example microfluidic device 200. The microfluidic device 200 includes a microfluidic network 110, a drop ejector 120, and a drive fluid storage volume 130 connected in series between the microfluidic network 110 and the drop ejector 120. For further description of the above components of the microfluidic device 200, the description of the microfluidic device 100 of FIG. 1 may be referenced. For sake of clarity, only the differences between the microfluidic device 200 and the microfluidic device 100 will be described in detail.

The microfluidic device 200 may include an operational fluid waste chamber 210 connected in series between the microfluidic network 110 and the drive fluid storage volume 130. The operational fluid waste chamber 210 may contain air or other inert fluid.

As the drive fluid is ejected from drop ejector 120, the operational fluid may be pulled into the operational fluid waste chamber 210 rather than into the drive fluid storage volume 130. The operational fluid waste chamber 210 may thereby inhibit mixing of the operational fluid with the drive fluid. The operational fluid waste chamber 210 may serve as a sump to collect operational fluid after it has been used within the microfluidic network 110.

Although termed a chamber, it is to be understood that in other examples the operational fluid waste chamber 210 may include a chamber, channel, passage, conduit, volume, other component, or network thereof.

Figure 3:
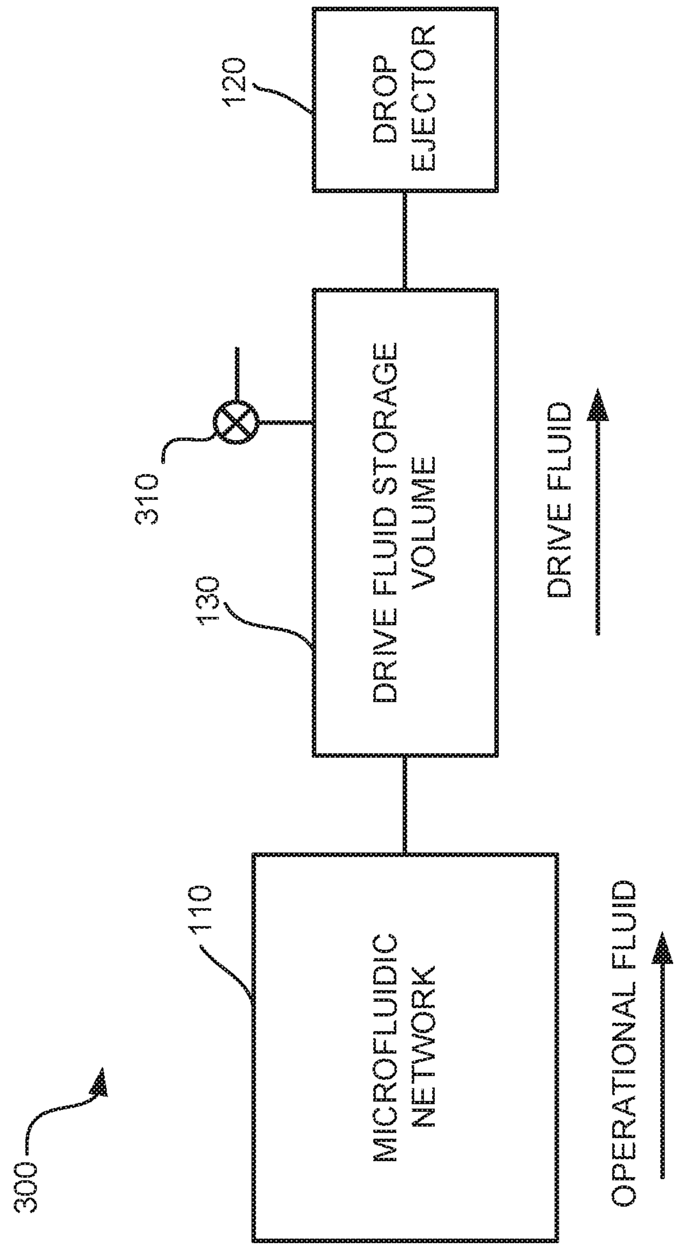
FIG. 3 is a schematic diagram of another example microfluidic device that uses drop ejection of drive fluid to induce flow of operational fluid, the microfluidic device including a backpressure control element.

FIG. 3 is a schematic diagram of another example microfluidic device 300. The microfluidic device 300 includes a microfluidic network 110, a drop ejector 120, and a drive fluid storage volume 130 connected in series between the microfluidic network 110 and the drop ejector 120. For further description of the above components of the microfluidic device 300, the description of the microfluidic device 100 of FIG. 1 may be referenced. For sake of clarity, only the differences between the microfluidic device 300 and the microfluidic device 100 will be described in detail.

The drive fluid storage volume 130 may include a backpressure control element 310 to maintain pressure at the drop ejector 120. The backpressure control element 310 may include a backpressure control valve.

The backpressure control element 310 may prevent loss of a meniscus of drive fluid at a nozzle of the drop ejector 120 caused by a force external to the microfluidic device 300 such as a change in ambient pressure or temperature or a change in orientation or movement of the microfluidic device 300. The backpressure control element 310 may provide relief to accommodate volumetric expansion of fluids in the microfluidic device 300.

Although the backpressure control element 310 is included on the drive fluid storage volume 130, it is to be understood that in other examples a backpressure control element may be located anywhere between the microfluidic network 110 and drop ejector 120.

In some examples, the drive fluid storage volume 130 may include an elastomer diaphragm to maintain backpressure against volumetric expansion of the fluids in the microfluidic device 300. In other examples, the drive fluid storage volume 130 may include a deformable wall biased by a spring, or a bag film, to maintain backpressure against volumetric expansion of the fluids in the microfluidic device 300.

In some examples, the drive fluid storage volume 130 may include a capillary medium in the drive fluid storage volume 130, a vent on the capillary medium, and a bubbler on the microfluidic network 110, to maintain backpressure in the fluids in the microfluidic device 300. The vent on the capillary medium may be opened during transport and storage of the microfluidic device 300. The vent may be closed during operation of the microfluidic device 300, while the bubbler in the microfluidic network 110 maintains backpressure in the microfluidic device 300.

Figure 4:
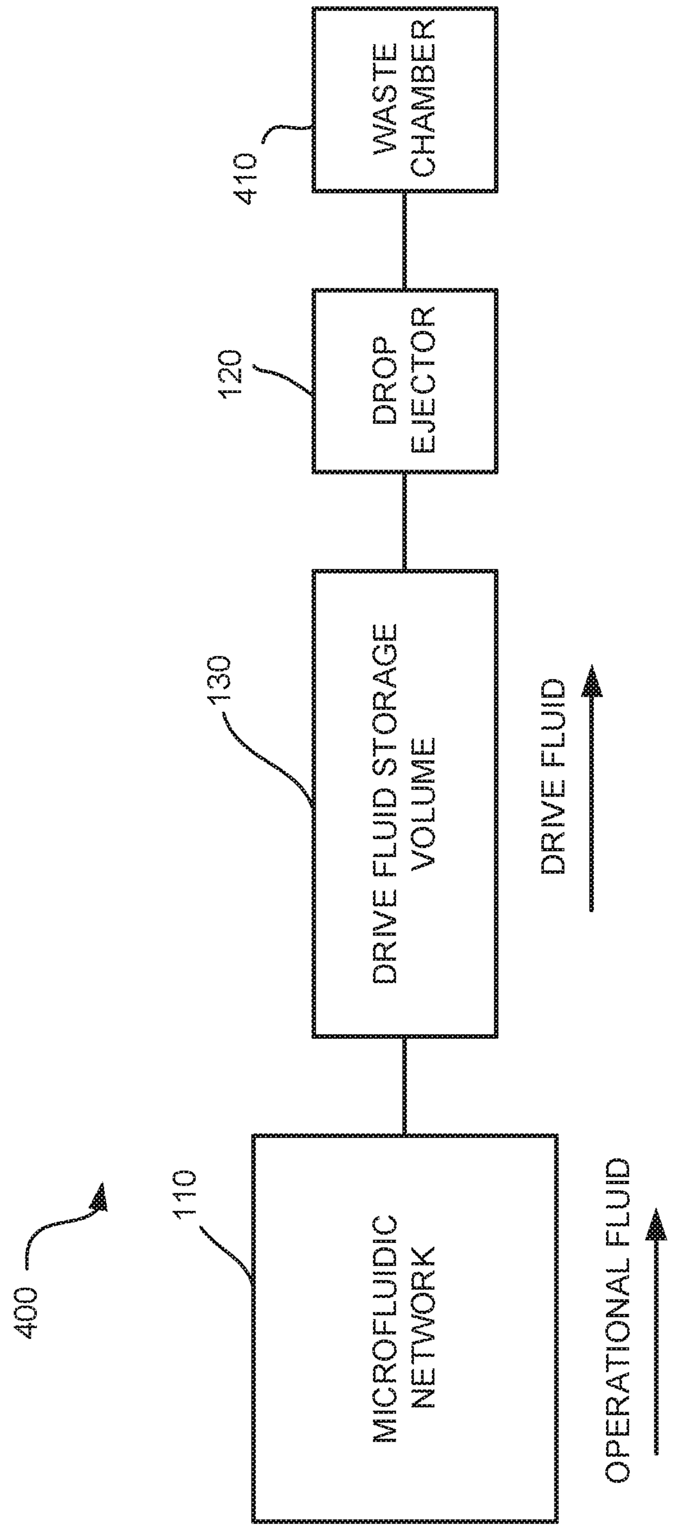
FIG. 4 is a schematic diagram of another example microfluidic device that uses drop ejection of drive fluid to induce flow of operational fluid, the microfluidic device including a waste chamber for drive fluid.

FIG. 4 is a schematic diagram of another example microfluidic device 400. The microfluidic device 400 includes a microfluidic network 110, a drop ejector 120, and a drive fluid storage volume 130 connected in series between the microfluidic network 110 and the drop ejector 120. For further description of the above components of the microfluidic device 400, the description of the microfluidic device 100 of FIG. 1 may be referenced. For sake of clarity, only the differences between the microfluidic device 400 and the microfluidic device 100 will be described in detail.

An outlet of the drop ejector 120 may be coupled to a drive fluid waste chamber 410 for receiving and storing drops of ejected drive fluid. The drive fluid waste chamber 410 may include an absorber, such as a capillary medium, to absorb and retain drive fluid ejected into the drive fluid waste chamber 410. Drive fluid may thereby be prevented from leaking from microfluidic device 400 during storage or transport or volumetric expansion of the fluids in the microfluidic device 400.

Figure 5:
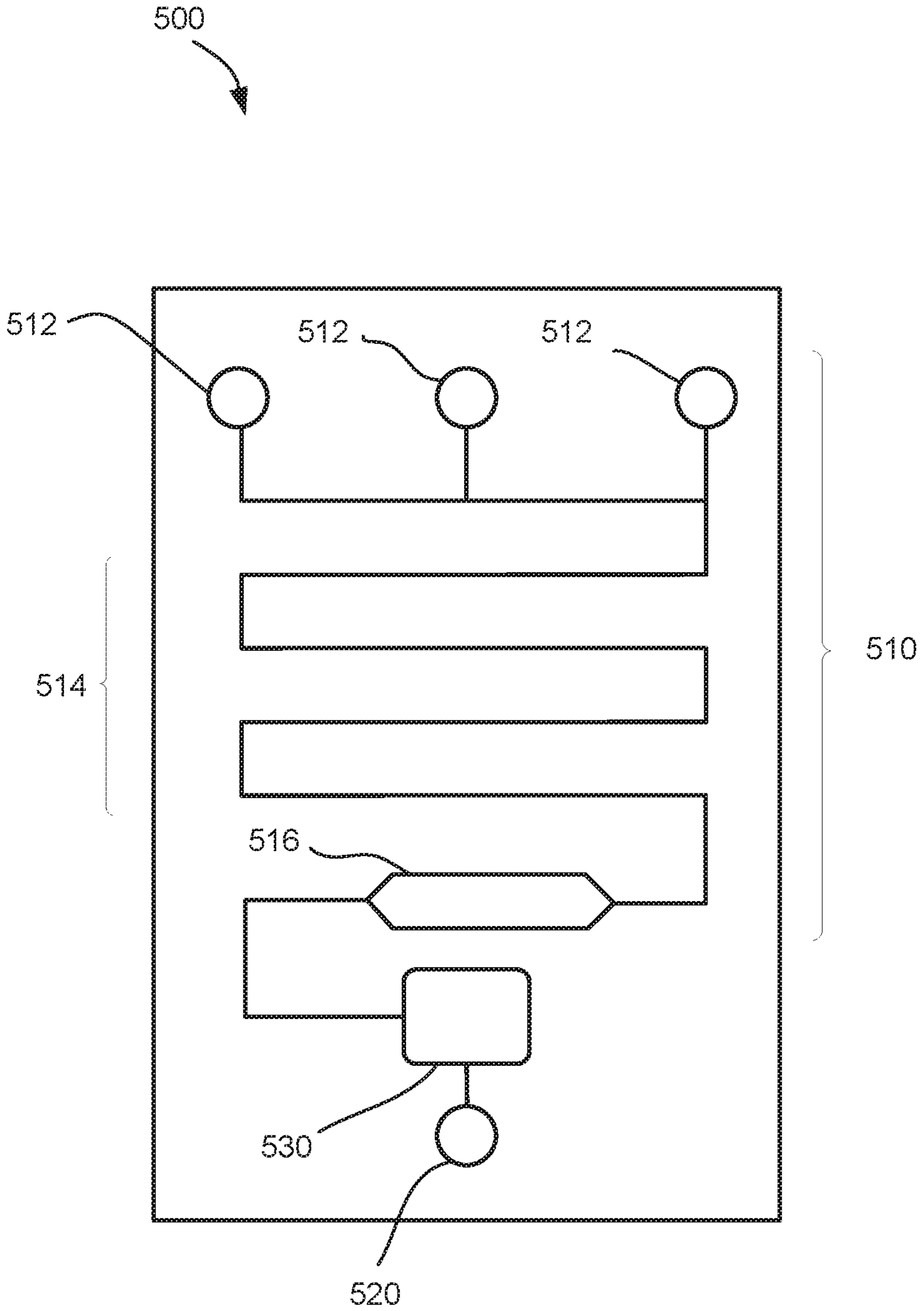
FIG. 5 is a schematic diagram of another example microfluidic device that uses drop ejection of drive fluid to induce flow of operational fluid.

FIG. 5 is a schematic diagram of a microfluidic device 500. The microfluidic device 500 includes a microfluidic network 510, a drop ejector 520, and a drive fluid storage chamber 530 connected in series between the microfluidic network 510 and the drop ejector 520. For further description of the above components of the microfluidic device 500, the description of the microfluidic device 100 of FIG. 1 may be referenced. For sake of clarity, only the differences between the microfluidic device 500 and the microfluidic device 100 will be described in detail.

The microfluidic network 510 may include inlets 512 for receiving inputs of different operational fluids to carry out operations on the microfluidic device 500. For example, the inlets 512 may receive different biological or chemical reactants to be mixed for analysis of the reaction products.

The microfluidic network 510 may include a serpentine conduit 514 downstream of the inlets 512. The serpentine conduit 514 may provide for mixing of the operational fluids.

The microfluidic network 510 may include an enlarged conduit 516 downstream of the serpentine conduit 514. The enlarged conduit 516 may serve as a sump or storage volume for the reaction products of the operational fluids. The enlarged conduit 516 may contain air or other inert fluid. The enlarged conduit 516 may inhibit mixing of the operational fluid with the drive fluid. The reaction products may not be compatible with drop ejection from the drop ejector 520. The reaction products may be analyzed in the enlarged conduit 516 by fluoroscopy or other technique.

The microfluidic network 510, serpentine conduit 514, and enlarged conduit 516 may have different structure than shown.

The microfluidic network 510 may be similar or identical to the microfluidic network 110. The microfluidic network 510 may include an air vent or other pressure regulating element to equalize pressure in the microfluidic network 510.

The enlarged conduit 516 may be connected to a drive fluid storage chamber 530. The drive fluid storage chamber 530 may be loaded with a drive fluid which is optimized for ejection from drop ejector 520. The drop ejector 520 may be pre-wetted with the drive fluid.

The drive fluid storage chamber 530 may be similar or identical to the drive fluid storage volume 130. In some examples, the stored volume of drive fluid in drive fluid storage chamber 530 may be greater than the transported volume of the operational fluid drawn through the microfluidic network 510. The drive fluid storage chamber 530 may include a backpressure control element to maintain pressure at the drop ejector 520, such as a backpressure control valve, an elastomer diaphragm, a deformable wall biased by a spring, or a bag film.

The drop ejector 520 may be similar or identical to the drop ejector 120. The drop ejector 520 may include a thermal drop ejector, an inertial pump, a piezoelectric drop ejector, or an electro-osmosis pump.

The drop ejector 520 may be coupled to a waste chamber for receiving drops of drive fluid ejected from the microfluidic device 500. The waste chamber may include an absorber.

In operation, operational fluids may be input through inlets 512, and the drop ejector 520 may eject drive fluid. Ejection of drive fluid may cause negative pressure in the microfluidic network 510, which may pull operational fluids through the serpentine conduit 514. The operational fluids may mix and react. Continued ejection of drive fluid may draw the operational fluids into enlarged conduit 516, where reaction products may be analyzed. The reaction products may only partly fill the enlarged conduit 516, and therefore may not make fluid contact with the drive fluid in drive fluid storage chamber 530.

Therefore, the drive fluid and drop ejector 520 may provide fluid flow of the operational fluids through the microfluidic network 510 for performing processes therein. The characteristics of the operational fluids need not be compromised for compatibility with drop ejector 520.

Figure 6:
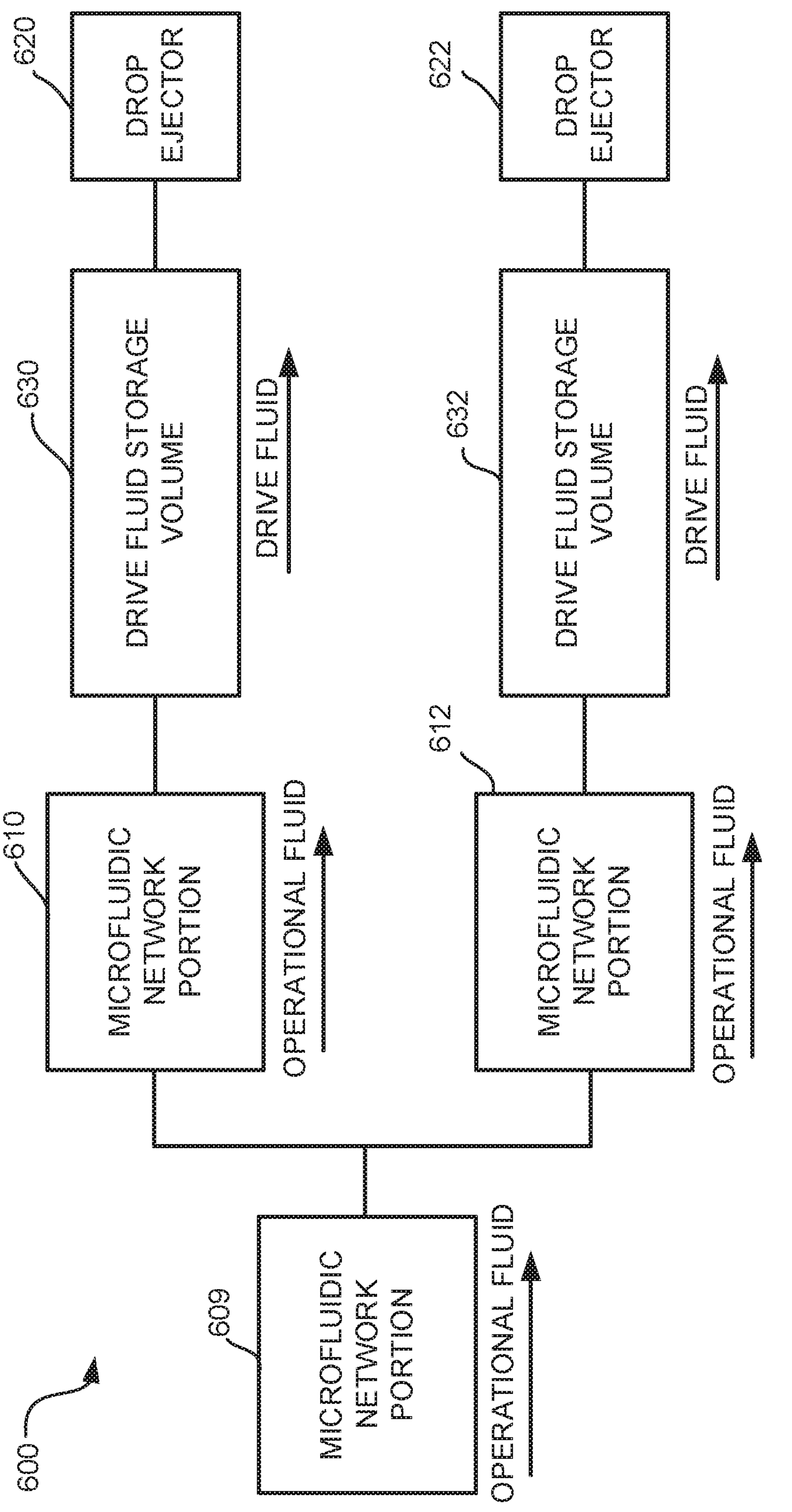
FIG. 6 is a schematic diagram of another example microfluidic device that uses drop ejection of drive fluid to induce flow of operational fluid, the microfluidic device including a microfluidic network including multiple branching microfluidic network portions.

Other applications include other biological and chemical testing, polymerase chain reaction (PCR) processes, loop-mediated isothermal amplification (LAMP) processes, biological cell manipulation, protein crystallization processes, cooling processes, fuel cell operation, and other processes, FIG. 6 is a schematic diagram of another example microfluidic device 600, The microfluidic device 600 includes microfluidic network portions 609, 610, and 612. The microfluidic device 600 further includes a drive fluid storage volume 630 connected downstream of the microfluidic network portion 610, and a drop ejector 620 connected downstream of the drive fluid storage volume 630. The microfluidic device 600 further includes a drive fluid storage volume 632 connected downstream of the microfluidic network portion 612, and a drop ejector 622 connected downstream of the drive fluid storage volume 632.

The microfluidic network portions 609, 610, and 612, may be similar or identical to the microfluidic network 110 of the microfluidic device 100 of FIG. 1. Further, the drive fluid storage volumes 630 and 632 may be similar or identical to the drive fluid storage volume 130 of the microfluidic device 100 of FIG. 1. Further, the drop ejectors 620 and 622 may be similar or identical to the drop ejector 120 of the microfluidic device 100 of FIG. 1. For further description of the above components of the microfluidic device 600, the description of the microfluidic device 100 of FIG. 1 may be referenced. For sake of clarity, only the differences between the microfluidic device 600 and the microfluidic device 100 will be described in detail.

The microfluidic network portions 610 and 612 may be parallel downstream branches from the microfluidic network portion 609. In operation, drop ejection of the drive fluid in the drive fluid storage volume 630 from the drop ejector 620 may induce flow of the operational fluid in the microfluidic network portion 610, and induce flow of the operational fluid in the microfluidic network portion 609, without inducing flow of the operational fluid in the microfluidic network portion 612. Thus, flow of operational fluid through different portions of a microfluidic network may be induced independently by different drop ejectors.

In some examples, the operational fluid in the microfluidic network portion 610 may be different from the operational fluid in the microfluidic network portion 612. Thus, different microfluidic operations involving different operational fluids may be controlled independently by different drop ejectors.

Further, in some examples, the drive fluid in the drive fluid storage volume 630 may be different from the drive fluid in the drive fluid storage volume 632. Thus, different drive fluids optimized for different conditions may be used independently of other drive fluids to induce fluid flow in a microfluidic network.

Thus, it may be seen from the above that a microfluidic device may include a microfluidic network, a drop ejector, and a drive fluid storage volume connected in series between the microfluidic network and the drop ejector. The microfluidic network may contain operational fluid optimized for microfluidic processes, and the drive fluid storage volume may contain drive fluid optimized for drop ejection. The drop ejector and drive fluid may be used to flow operational fluid through the microfluidic network without compromising fluid characteristics of the operational fluid or the drive fluid.

The scope of the claims should not be limited by the embodiments set forth in the above examples, but should be given the broadest interpretation consistent with the description as a whole.

The invention claimed is:

1. A microfluidic device comprising:

a microfluidic network through which operational fluid is to flow;

a drop ejector; and a drive fluid storage volume to contain drive fluid, the drive fluid storage volume connected in series between the microfluidic network and the drop ejector;

wherein ejection of the drive fluid by the drop ejector draws the operational fluid through the microfluidic network; and wherein the drop ejector comprises a thermal drop ejector which generates a bubble to eject a drop of fluid out a nozzle of the drop ejector.

2. The microfluidic device of claim 1, further comprising an operational fluid waste chamber connected in series between the microfluidic network and the drive fluid storage volume to inhibit mixing of the operational fluid with the drive fluid.

3. The microfluidic device of claim 1, wherein the drive fluid storage volume comprises a backpressure control element to maintain pressure at the drop ejector.

4. The microfluidic device of claim 1, further comprising a drive fluid waste chamber coupled to an outlet of the drop ejector to receive and store drops of drive fluid ejected from the drop ejector.

5. The microfluidic device of claim 4, wherein the drive fluid waste chamber includes an absorber to absorb drive fluid ejected into the drive fluid waste chamber.

6. The microfluidic device of claim 1, wherein the microfluidic device brings the operational fluid and the drive fluid into contact.

7. The microfluidic device of claim 1, wherein ejection of the drive fluid by the drop ejector draws the operational fluid into the drive fluid storage volume.

8. The microfluidic device of claim 1, wherein the drop ejector provides active control and modulation of fluid flow through the microfluidic network.

9. The microfluidic device of claim 1, further comprising a plurality of inlets for receiving different operational fluids.

10. The microfluidic device of claim 9, wherein the microfluidic network includes a serpentine conduit downstream of the inlets for mixing of the different operational fluids, and an enlarged conduit downstream of the serpentine conduit for products of reactions between the different operational fluids.

11. A microfluidic device comprising:

a droplet ejector;

a drive fluid storage volume upstream the droplet ejector; and drive fluid loaded in the drive fluid storage volume;

wherein ejection of the drive fluid by the droplet ejector transports operational fluid through a microfluidic network upstream of the drive fluid storage volume; and wherein the drop ejector comprises a thermal drop ejector which generates a bubble to eject a drop of fluid out a nozzle of the drop ejector.

12. The microfluidic device of claim 11, wherein:

the drive fluid is compatible with wetting the drop ejector by passive capillary action; and the operational fluid is incompatible with wetting the drop ejector by passive capillary action.

13. A microfluidic device comprising:

a microfluidic network loaded with operational fluid;

a droplet ejector connected to the microfluidic network; and a drive fluid storage chamber loaded with drive fluid, the drive fluid storage chamber connected in series between the microfluidic network and the drop ejector;

wherein ejection of the drive fluid by the droplet ejector reduces pressure in the microfluidic device to flow the operational fluid through the microfluidic network; and wherein the operational fluid and the drive fluid are liquids, and wherein the operational fluid is in fluid contact with the drive fluid.

14. The microfluidic device of claim 13, wherein the drive fluid stored in the drive fluid storage chamber has a volume greater than a transported volume of the operational fluid drawn through the microfluidic network.

15. The microfluidic device of claim 13, wherein the operational fluid is incompatible with ejection from the droplet ejector.

16. The microfluidic device of claim 15, wherein the operational fluid comprises a non-aqueous fluid.

17. The microfluidic device of claim 15, wherein the operational fluid is less efficiently ejected from the drop ejector than the drive fluid based on at least one of a viscosity, a surface tension, a density, or a boiling point of the operational fluid.

18. The microfluidic device of claim 15, wherein the operational fluid contains solids.

* * * * *